United States Patent Office 3,234,299
Patented Feb. 8, 1966

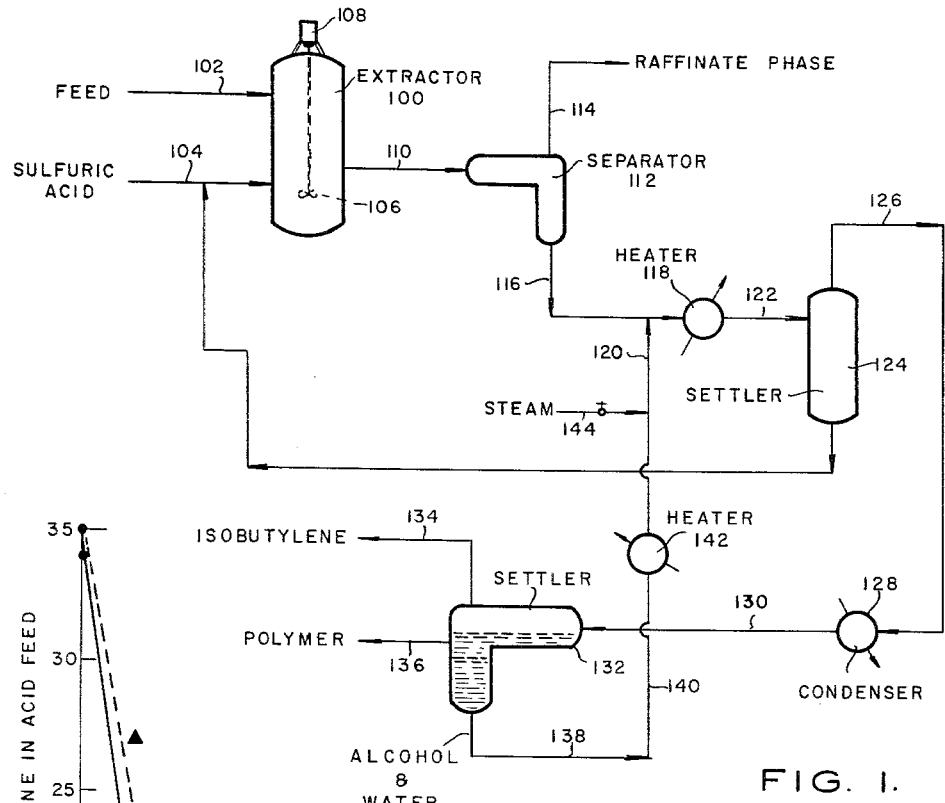
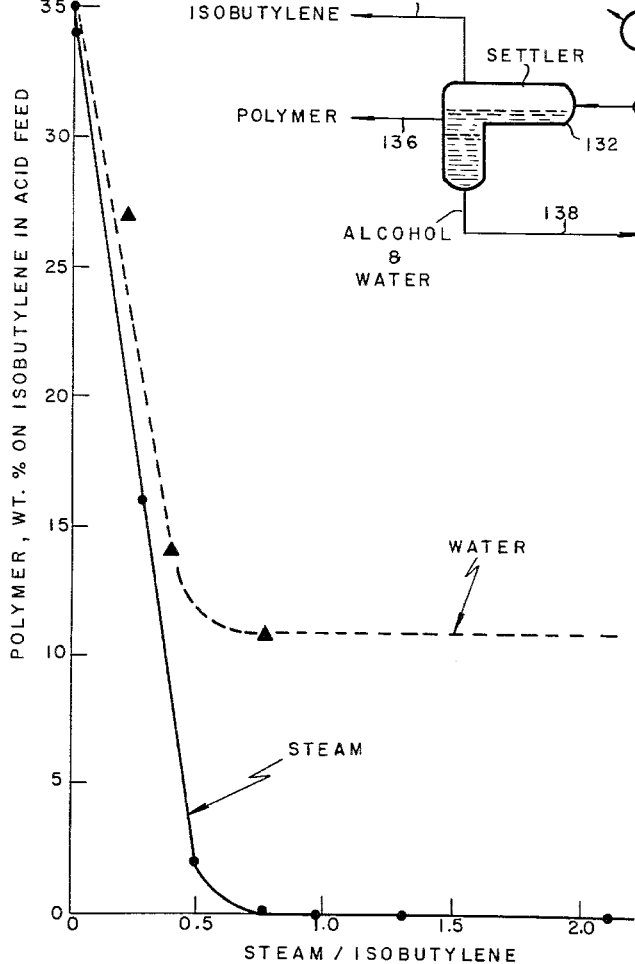
FIG. 1.
FIG. 2.

3,234,299
REGENERATION OF ISOBUTYLENE
William R. Edwards, Robert D. Wesselhoft, and Thomas B. Everage, Baytown, Tex., assignors, by mesne assignments, to Esso Research and Engineering Company, Elizabeth, N.J., a corporation of Delaware
Filed Oct. 25, 1962, Ser. No. 233,002
3 Claims. (Cl. 260—677)

The present invention is directed to the recovery of isobutylene from a fat sulfuric acid extract. More specifically, the present invention is concerned with the thermal regeneration of isobutylene from a fat sulfuric acid extract without a net dilution of the sulfuric acid, so that the isobutylene-free acid can be reused for extraction without reconcentration. The present invention is directed to provide a process whereby the isobutylene may be regenerated under the above conditions, while substantially minimizing the formation of polymer.

During thermal regeneration of isobutylene from 60 to 65 weight percent sulfuric acid by indirectly heating the fat acid in a heat exchanger, it has been found that the liberation of water vapor during the indirect heating of the fat acid extract concentrates the acid to a degree which promotes excessive polymerization. Polymer losses of about 38% have been suffered (based on isobutylene in the acid). In order to avoid this effect, it has been customary to dilute the acid before regeneration, for example, by adding water to the acid and introducing the diluted acid extract into the exchanger. Thus, the polymer formation can be reduced by adding from 0.4 to about 0.75 pound of water per pound of reacted isobutylene. Polymer formation is reduced to about 11 to 15% by weight.

Attempts further to lower the polymer formation by addition of more water prove fruitless because of the difficulty in obtaining fast heating of the fat acid extract where large amounts of water are present. This lowered rate of heating results in a longer residence time of the isobutylene in the acid phase, which promotes polymerization.

Surprisingly, it has been found that by injecting steam into the fat acid extract just immediately prior to introduction of the fat acid extract into the heat exchanger, the amount of polymer formation can be drastically reduced. By maintaining the amount of steam injected within the range of about 0.5 pound per pound of reacted isobutylene to about 1.0 pound of steam per pound of reacted isobutylene, the polymer formation can be kept at substantially negligible levels. Where more than 1.0 pound per pound of steam is used, the amount of t-butyl alcohol which is formed begins to increase, and thus the net recovery of isobutylene as the free olefin is reduced.

By reference to FIG. 1, the practice of the present invention is clearly set forth in the full combination process, which includes the extraction of isobutylene and the recycle of regenerated acid to the recycle zone.

Referring now to FIG. 1, isobutylene is introduced into an extractor 100 in admixture with its $C_4$ isomers by way of line 102 and is contacted with from 60 to 65 weight percent sulfuric acid introduced by way of line 104. The acid and hydrocarbon are admixed at a temperature from about 20° F. to about 130° F. for about 30 to 60 minutes by means 106 driven by motor 108, and are discharged by way of line 110 for separation in separator 112. The isobutylene reacts with the acid to form a fat acid extract whereas the remainder of the olefins and paraffinic isomers of isobutylene are removed as a raffinate phase by way of line 114. The fat acid extract containing preferably from about 15 to about 40% isobutylene by weight is removed from the settler 112 by way of line 116 and is passed into heater 118, wherein the fat acid is raised quickly to a temperature of about 275° F. to about 325° F. in order thermally to separate the isobutylene from reaction with the acid. Residence time is held to a minimum, preferably about 0.01 second. Immediately prior to introduction of the fat acid into the heater 118, steam is added by way of line 120, in amounts of 0.5 to 1.0 pound of steam per pound of isobutylene in the fat acid phase. The conditions within the heater are controlled such that the concentration of the acid in the effluent from the heater is maintained within a desired range, for example, from about 60 to about 65% by weight. The steam added to the system by way of line 120 and the released isobutylene are passed from heater 118 in the vapor phase, while the acid is in the liquid phase. The mixed phase effluent is passed through line 122 to settler 124. The steam and isobutylene phase, containing some t-butyl alcohol, is passed overhead by way of line 126 through condenser 128 and line 130 into a settler 132. Isobutylene is passed overhead by way of line 134 while polymer is removed as a top liquid layer by way of line 136. The alcohol and water phase may be recycled by way of lines 138 and 140, heater 142, and line 120 for vaporization and admixture with the fat acid. Additional steam may be added by way of line 144 if necessary to make up for losses from the system.

Referring now to FIG. 2, the effect of the ratio of steam to reacted isobutylene when compared with polymer formation is graphically shown, and is also shown in comparison with the addition of water rather than of steam. As is easily apparent by a comparison of the two curves, the addition of steam can substantially prevent the formation of polymer, whereas the use of water cannot lower the formation of polymer below about 11%. As is seen by advertence to FIG. 2, at about 0.5 pound of steam per pound of reacted isobutylene, only 2% polymer is formed, whereas at about 0.75 pound of steam per pound of reacted isobutylene, virtually no formation of

*Table I*

Acid Strength: 64 Wt. percent $H_2SO_4$
Acid Fatness: 36 Wt. percent isobutylene
Residence Time: About 0.01 sec.

| Run No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Lb. Steam/lb. reacted $iC_4^=$ | 0 | 0 | ¹0.2 | ¹0.36 | ¹0.36 | ¹0.75 | 0.28 | 0.49 | 0.74 | 0.96 | 1.3 | 2.1 | 0.47 | 0.62 |
| System pressure, p.s.i.g. | 0 | 0 | 0 | 0 | 0 | 0 | 0 | 0 | 0 | 0 | 0 | 0 | 10 | 15 |
| Regeneration Final Temp., °F. | 275 | 284 | 285 | 295 | 235 | 280 | 307 | 315 | 310 | 319 | 300 | 300 | 300 | 312 |
| Regen. Acid Strength, Wt. percent | 68 | 65 | 65 | 65 | 65 | 65 | 65 | 65 | 65 | 65 | 69 | 67 | 64 | 65 |
| $iC_4^=$ in Regen. Acid, Wt. percent | 0 | 0 | 0 | 0 | 0 | | 0 | 0 | 0 | 0 | 0 | 0 | 0 | 0 |
| $iC_4^=$ Regenerated, Wt. percent | 100 | 100 | 100 | 100 | 100 | 100 | 100 | 100 | 100 | 100 | 100 | 100 | 100 | 100 |
| Isobutylene Recovered as— | | | | | | | | | | | | | | |
| Isobutylene | 63 | 61 | 70 | 80 | 46 | | 83 | 97 | 98 | 98 | 89 | 87 | 92 | 92 |
| t-Butyl alcohol | 2 | 5 | 4 | 6 | 40 | | 1 | 1 | 2 | 2 | 11 | 13 | 7 | 5 |
| Polymer | 35 | 34 | 27 | 14 | 14 | 11 | 16 | 2 | 0 | 0 | 0 | 0 | 1 | 3 |
| Feed Rate, lb./hr. | 6.1 | 36 | 36 | 26 | 26 | | 26 | 26 | 26 | 20 | 10.2 | 9.2 | 41.7 | 3.6 |

¹ Water instead of steam.

polymer is suffered. At 0.75 pound of water per pound of isobutylene, 11% polymer is formed.

In order to illustrate the present invention, to provide a means of comparison of the present invention with thermal regeneration of isobutylene from acid extracts with no steam added or with water added rather than steam, a number of runs were made and the results tabulated in Table I. During all of the runs, the extraction acid was 64% by weight, and the isobutylene reacted with the acid comprised 36% by weight of the fat acid extract. The residence time in the regenerating heater at all times was less than 0.01 second.

Runs 1 and 2 illustrate the polymer formation where no steam or water were added. In each case, about 35% of the isobutylene was polymerized. Runs 3 through 6 are illustrative of the dilution of the fat acid by adding water immediately before introduction into the regenerative heater. Run 3 illustrates the use of 0.2 pound of water per pound of reacted isobutylene, and shows that 27% polymerization was obtained. This is but slight improvement over the base case wherein no diluent was added. Runs 4 and 5 illustrate the use of 0.36 pound of water per pound of reacted isobutylene, and show that the formation of 14% polymer was obtained. Run 6 shows the use of a large amount of water, 0.75 pound per pound of reacted isobutylene, which produced a minimum polymer formation of 11%.

Runs 7 through 14 illustrates the practice of the present invention. Run 7 uses 0.28 pound of steam per pound of reacted isobutylene, which is roughly halfway between the amounts used in Runs 3, 4, and 5, wherein water was added. The amount of polymer suffered by the addition of 0.28 pound of the steam was 16%, which was somewhat of an improvement over Run 3 which had 27% polymer formation, and which is roughly equivalent to the results obtained in Runs 4 and 5 wherein 0.36 pound of water was added. But 16% is still uneconomically high.

Run 6 shows the addition of about the minimum amount of steam according to the present invention. Only 2% polymer was suffered where 0.49 pound of steam per pound of reacted isobutylene was used. Runs 7 and 8 utilize 0.74 and 0.96 pound of steam per pound of reacted isobutylene respectively, and no polymer losses were suffered in either case. Run 11 shows the use of 1.3 pounds of steam per pound of reacted isobutylene, and no polymer formation was suffered. However, 11% of the isobutylene was recovered as t-butyl alcohol rather than as pure isobutylene. Confirming the trend, Run 12 shows the use of 2.1 pounds of steam per pound of reacted isobutylene, and no polymer formation was suffered but 13% of the isobutylene was recovered as t-butyl alcohol.

Runs 13 and 14 show the effect of raising the pressure of the regenerative system. In Run 13, 0.47 pound of steam per pound of reacted isobutylene was used, but the pressure was raised from ambient to 10 p.s.i.g. Only 1% polymer formation was suffered, but the amount of isobutylene recovered as t-butyl alcohol (7%) was greater than that found in the comparison case in Run 8 wherein only 1% alcohol was formed.

Run 14 shows the use of 0.62 pound of steam per pound of reacted isobutylene, with the pressure of 15 p.s.i.g. Three percent polymer was formed, with about 5% of the isobutylene being recovered as t-butyl alcohol. Thus, it is seen that the higher pressures had little effect on the formation of polymer and only a minor effect on alcohol formation.

It should be noted that the formation of alcohol is favored by lower temperatures and this is in general confirmed by advertence to Run 5 wherein the effluent temperature was only 235° F., resulting in 40% of the isobutylene being recovered as t-butyl alcohol. It is noted that this run was made while using 0.36 pound of water per pound of isobutylene reacted in the acid phase. Note that in Run 12, using 2.1 pounds of steam per pound of reacted isobutylene, only 13% of the isobutylene was recovered as alcohol. The effluent temperature of 300° F. was easily attained because of the heat input with the steam, whereas the low temperature of 235° F. in Run 5 resulted at least partially from the inability of the heat exchanger to raise the temperature of and vaporize liquid water during the short residence time.

Note that the pressure in the regeneration determines the boiling point of the acid effluent and may be used to control the concentration of the acid leaving the regenerator. Otherwise, it is immaterial. A preferred range is from 3 to 5 p.s.i.g., but a good workable range may be found anywhere from 0 to 50 p.s.i.g.

Having disclosed in detail the essence of the present invention and the best mode set forth, what is desired to be covered should be limited not by the specific examples given, but rather by the appended claims.

We claim:
1. In the thermal regeneration of a 60% to 65% sulfuric acid extract containing from 15% to 40% reacted isobutylene wherein the acid extract is indirectly heated to a final temperature within the range from about 275° F to 325° F., the improvement which consists in admixing from 0.5 to 1.0 pound of steam per pound of reacted isobutylene with said acid extract immediately prior to said indirect heating, and indirectly heating said admixture to said final temperature, whereby substantially complete recovery of isobutylene from said acid is accomplished without substantial losses of isobutylene to polymer, and without net concentration of the sulfuric acid.

2. A method in accordance with claim 1 wherein the acid fatness is about 36%, and about 0.58 pound of steam per pound of reacted isobutylene is added.

3. In the thermal regeneration of a 60% to 65% sulfuric acid extract containing from 15% to 40% reacted isobutylene wherein the acid extract is indirectly heated to a final temperature within the range from about 275° F. to 325° F., the improvement which consists in admixing with said acid extract immediately prior to said indirect heating at least 0.5 pound of steam per pound of reacted isobutylene, and indirectly heating said admixture to said final temperature, whereby substantially complete recovery of isobutylene from said acid is accomplished without substantial losses of isobutylene to polymer, and without net concentration of the sulfuric acid.

References Cited by the Examiner

UNITED STATES PATENTS

| | | | |
|---|---|---|---|
| 2,380,350 | 7/1945 | Willauer et al. | 260—677 |
| 2,470,207 | 5/1949 | Garrett | 260—677 |
| 2,509,885 | 5/1950 | Rupp et al. | 260—677 |
| 2,560,362 | 7/1951 | Morrell et al. | 260—677 |
| 2,968,682 | 1/1961 | Crouse et al. | 260—677 |

FOREIGN PATENTS 523,894  7/1940  Great Britain.

ALPHONSO D. SULLIVAN, *Primary Examiner.*